(12) United States Patent
Nance et al.

(10) Patent No.: US 8,321,462 B2
(45) Date of Patent: Nov. 27, 2012

(54) CUSTODIAN BASED CONTENT IDENTIFICATION

(75) Inventors: Megan Nance, Sunnyvale, CA (US); Mayur Datar, Santa Clara, CA (US); Julie Tung, Mountain View, CA (US); Bahman Rabii, Berkeley, CA (US); Jason C. Miller, San Francisco, CA (US); Mike Hochberg, Sunnyvale, CA (US); Jeremiah Harmsen, Mountain View, CA (US); Tomasz J. Tunguz-Zawislak, San Francisco, CA (US); Andres S. Perez-Bergquist, Mountain View, CA (US)

(73) Assignee: Google Inc., Mountain View, CA (US)

( * ) Notice: Subject to any disclaimer, the term of this patent is extended or adjusted under 35 U.S.C. 154(b) by 78 days.

(21) Appl. No.: 11/694,618

(22) Filed: Mar. 30, 2007

(65) Prior Publication Data

US 2008/0243526 A1 Oct. 2, 2008

(51) Int. Cl.
*G06F 7/00* (2006.01)
*G06F 17/30* (2006.01)

(52) U.S. Cl. .......... 707/790; 707/802; 707/804; 706/11; 706/13; 706/16; 706/45

(58) Field of Classification Search .................. 707/1, 6, 707/9, 10, 100, 104.1, 600–899, 999.001–999.206; 709/218
See application file for complete search history.

(56) References Cited

U.S. PATENT DOCUMENTS

| | | | |
|---|---|---|---|
| 5,721,910 A | 2/1998 | Unger et al. | |
| 5,724,521 A | 3/1998 | Dedrick | |
| 5,740,549 A | 4/1998 | Reilly et al. | |
| 5,752,023 A | 5/1998 | Choucri et al. | |
| 5,848,397 A | 12/1998 | Marsh et al. | |
| 5,948,061 A | 9/1999 | Merriman | |
| 6,009,410 A | 12/1999 | LeMole et al. | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,345,293 B1 | 2/2002 | Chaddha | |
| 6,401,075 B1 | 6/2002 | Mason et al. | |

(Continued)

FOREIGN PATENT DOCUMENTS

KR 1020020005147 A 1/2002

(Continued)

OTHER PUBLICATIONS

Spertus, E., et al. (2005) "Evaluating Similarity Measures: A Large-Scale Study in the Orkut Social Network". Appeared in: KDD '05: The Eleventh ACM SIGGKDD International Conference on Knowledge Discovery and Data Mining, Chicago, IL.

(Continued)

*Primary Examiner* — Angelica Ruiz
(74) *Attorney, Agent, or Firm* — Fish & Richardson P.C.

(57) ABSTRACT

A custodian profile, e.g., a user profile, associated with a first content item, e.g., an associated web page in a social network, can be identified as a first content item. The first content item can be utilized to identify one or more second content items, e.g., advertisements, that are displayed when the first content item is presented, e.g., viewed by another user of the social network.

16 Claims, 5 Drawing Sheets

U.S. PATENT DOCUMENTS

| | | | |
|---|---|---|---|
| 6,985,882 | B1 | 1/2006 | Del Sesto |
| 7,039,599 | B2 | 5/2006 | Merriman |
| 7,136,875 | B2 | 11/2006 | Anderson et al. |
| 7,158,986 | B1 | 1/2007 | Oliver et al. |
| 7,159,011 | B1 | 1/2007 | Knight et al. |
| 7,177,904 | B1 | 2/2007 | Mathur et al. |
| 7,269,590 | B2 | 9/2007 | Hull et al. |
| 7,526,459 | B2 | 4/2009 | Flinn et al. |
| 7,809,740 | B2 | 10/2010 | Chung et al. |
| 2002/0049745 | A1* | 4/2002 | Yuichiro et al. .................. 707/1 |
| 2002/0103855 | A1 | 8/2002 | Chatani |
| 2003/0023489 | A1 | 1/2003 | McGuire et al. |
| 2003/0093311 | A1 | 5/2003 | Knowlson |
| 2004/0054577 | A1 | 3/2004 | Inoue et al. |
| 2004/0098386 | A1* | 5/2004 | Thint et al. ....................... 707/3 |
| 2004/0143588 | A1 | 7/2004 | Russell |
| 2004/0193691 | A1 | 9/2004 | Chang |
| 2005/0119936 | A1* | 6/2005 | Buchanan et al. .............. 705/14 |
| 2005/0165766 | A1* | 7/2005 | Szabo ............................... 707/3 |
| 2005/0171832 | A1* | 8/2005 | Hull et al. ....................... 705/10 |
| 2005/0216300 | A1* | 9/2005 | Appelman et al. ................ 705/1 |
| 2005/0216550 | A1* | 9/2005 | Paseman et al. ................ 709/202 |
| 2005/0283497 | A1* | 12/2005 | Nurminen et al. .......... 707/104.1 |
| 2006/0048059 | A1* | 3/2006 | Etkin ............................ 715/745 |
| 2006/0064360 | A1 | 3/2006 | Piccionelli et al. |
| 2006/0085417 | A1 | 4/2006 | John et al. |
| 2006/0200432 | A1 | 9/2006 | Flinn et al. |
| 2006/0230012 | A1 | 10/2006 | Ruvolo et al. |
| 2006/0235873 | A1* | 10/2006 | Thomas ........................ 707/102 |
| 2006/0248573 | A1* | 11/2006 | Pannu et al. ....................... 726/1 |
| 2006/0271953 | A1 | 11/2006 | Jacoby et al. |
| 2006/0278064 | A1* | 12/2006 | Lourdeaux ...................... 84/609 |
| 2006/0282303 | A1 | 12/2006 | Hale et al. |
| 2007/0011155 | A1* | 1/2007 | Sarkar ............................... 707/5 |
| 2007/0055656 | A1 | 3/2007 | Tunstall-Pedoe |
| 2007/0088713 | A1* | 4/2007 | Baxter et al. .................... 707/10 |
| 2007/0106627 | A1 | 5/2007 | Srivastava et al. |
| 2007/0112719 | A1* | 5/2007 | Reich et al. ..................... 706/48 |
| 2007/0112762 | A1* | 5/2007 | Brubaker ........................... 707/5 |
| 2007/0118802 | A1* | 5/2007 | Gerace et al. .................. 715/738 |
| 2007/0121843 | A1* | 5/2007 | Atazky et al. ............ 379/114.13 |
| 2007/0150537 | A1 | 6/2007 | Graham |
| 2007/0208789 | A1* | 9/2007 | Reichman ..................... 707/205 |
| 2007/0218900 | A1* | 9/2007 | Abhyanker ................ 455/435.1 |
| 2007/0233736 | A1* | 10/2007 | Xiong et al. ............... 707/104.1 |
| 2007/0255707 | A1* | 11/2007 | Tresser et al. ..................... 707/6 |
| 2007/0271234 | A1* | 11/2007 | Ravikiran ......................... 707/3 |
| 2008/0005125 | A1* | 1/2008 | Gaedeke ......................... 707/10 |
| 2008/0052371 | A1 | 2/2008 | Partovi et al. |
| 2008/0091692 | A1* | 4/2008 | Keith et al. ................... 707/100 |
| 2008/0104172 | A1 | 5/2008 | Craig |
| 2008/0243607 | A1 | 10/2008 | Rohan et al. |
| 2008/0243780 | A1 | 10/2008 | Nance et al. |

FOREIGN PATENT DOCUMENTS

| | | |
|---|---|---|
| KR | 1020030051610 | 6/2003 |
| KR | 1020030051610 A | 6/2003 |
| WO | WO 97/21183 | 6/1997 |
| WO | WO03007216 A1 | 1/2003 |
| WO | WO2005050513 | 6/2005 |
| WO | WO2005065229 A2 | 7/2005 |
| WO | WO2006104694 A2 | 10/2006 |
| WO | WO2008/121988 | 10/2008 |
| WO | WO2008/121989 | 10/2008 |
| WO | WO2008/121993 | 10/2008 |
| WO | WO2006135920 A3 | 4/2009 |

OTHER PUBLICATIONS

U.S. Appl. No. 95/001,073, filed Sep. 30, 2004, Reexamination of Stone et al.

U.S. Appl. No. 95/001,061, filed Sep. 3, 2002, Reexamination of Stone et al.

U.S. Appl. No. 95/001,069, filed Jul. 11, 2002, Reexamination of Dean et al.

U.S. Appl. No. 95/001,068, filed Dec. 7, 2002, Reexamination of Stone et al.

AdForce, Inc., A Complete Guide to AdForce, Version 2.6, 1998.

AdForce, Inc., S-1/A SEC Filing, May 6, 1999.

AdKnowledge Campaign Manager: Reviewer's Guide, AdKnowledge, Aug. 1998.

AdKnowledge Market Match Planner: Reviewer's Guide, AdKnowledge, May 1998.

Ad-Star.com website archive from www. Archive.org, Apr. 12, 1997 and Feb. 1, 1997.

Baseview Products, Inc., AdManagerPro Administration Manual v. 2.0, Dec. 1998.

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way to Buy and Sell Web Advertising Space," © 1997.

Information Access Technologies, Inc., Aaddzz.com website archive from www. Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, Control No. 95/001,073.

Request for Reexamination of U.S. Patent No. 6,446,045 B1, Control No. 95/001,061.

Request for Reexamination of U.S. Patent No. 7,249,059 B2, Control No. 95/001,069.

Request for Reexamination of U.S. Patent No. 6,829,587 B2, Control No. 95/001,068.

U.S. Appl. No. 11/694,307, filed Mar. 30, 2007, Nance et al.

U.S. Appl. No. 11/694,345, filed Mar. 30, 2007, Rohan et al.

International Preliminary Report on Patentability in Application No. PCT/US08/058949, dated Oct. 6, 2009.

International Search Report and Written Opinion in Application No. PCT/US08/058949, dated Sep. 12, 2008.

International Preliminary Report on Patentability in Application No. PCT/US08/058948, dated Oct. 6, 2009.

International Preliminary Report on Patentability in Application No. PCT/US2008/058953, dated Oct. 6, 2009.

Action & Response History in U.S. Appl. No. 11/694,345.

Action & Response History in U.S. Appl. No. 11/694,307.

USPTO Office Action in U.S. Appl. No. 11/694,345, mailed Jun. 24, 2009.

Fish & Richardson P.C., Amendment in Reply to Office Action dated Mar. 18, 2009 in U.S. Appl. No. 11/694,307, filed Jun. 18, 2009.

International Preliminary Report on Patentability in Application No. PCT/US08/058949, dated Aug. 17, 2011.

Fish & Richardson P.C. Amendment in Reply to Action dated Feb. 17, 2011, in U.S. Appl. No. 11/694,345, mailed Jun. 17, 2011.

Fish & Richardson P.C. Amendment in Reply to Action dated Mar. 10, 2011, in U.S. Appl. No. 12/727,186, mailed Jun. 16, 2011.

Fish & Richardson P.C. Amendment in Reply to Action dated Mar. 18, 2009, in U.S. Appl. No. 11/694,307 mailed Jun. 18, 2009, 11 pages.

USPTO Office Action in U.S. Appl. No. 11/694,345, mailed Jun. 24, 2009, 19 pages.

USPTO Office Action in U.S. Appl. No. 12/727,186, mailed Mar. 10, 2011, 12 Pages.

Supplementary European Search Report for Application No. EP 08 744 818.9, dated May 4, 2011, 3 pages.

Examination Report for Application No. EP 08 799 736.7, dated Feb. 17, 2011, 5 pages.

Supplemental European Search Report for Application No. EP 08 79 9736, dated Feb. 7, 2011, 3 pages.

USPTO Office Action in U.S. Appl. No. 11/694,307, mailed Mar. 18, 2009.

Fish & Richardson P.C. Amendment in Reply to Action dated Jun. 24, 2009, in U.S. Appl. No. 11/694,345 mailed Oct. 26, 2009.

USPTO Office Action in U.S. Appl. No. 11/694,345, mailed Jan. 29, 2010.
Fish & Richardson P.C. Amendment in Reply to Action dated Jan. 29, 2010, in U.S. Appl. No. 11/694,345 mailed Apr. 29, 2010.
USPTO Office Action in U.S. Appl. No. 11/694,345, mailed Jul. 20, 2010.
Fish & Richardson P.C. Amendment in Reply to Action dated Jul. 20, 2010, in U.S. Appl. No. 11/694,345 mailed Dec. 20, 2010.
Fish & Richardson P.C. RCE in Reply to Action dated Jul. 20, 2010, in U.S. Appl. No. 11/694,345 mailed Jan. 20, 2011.
USPTO Office Action in U.S. Appl. No. 11/694,345, mailed Feb. 17, 2011.
Spertus, E., et al. (2005) "Evaluating Similarity Measures: A Large-Scale Study in the Orkut Social Network". Appeared in: KDD '05: The Eleventh ACM SIGKDD International Conference on Knowledge Discovery and Data Mining, Chicago, IL. 7 pages.
International Search Report and Written Opinion in Application No. PCT/US2008/058953, dated Sep. 19, 2008. 10 pages.
International Search Report and Written Opinion in Application No. PCT/US2008/058948, dated Aug. 7, 2008. 9 pages.
European Search Report for Application No. EP 08 744 818.9, dated May 12, 2011, 6 pages.
USPTO Office Action in U.S. Appl. No. 11/694,345, mailed Oct. 14, 2011.
Fish & Richardson P.C. Amendment in Reply to Action dated Oct. 14, 2011, in U.S. Appl. No. 11/694,345, filed Mar. 8, 2012.
USPTO Office Action in U.S. Appl. No. 12/727,186, mailed Sep. 2, 2011.
Fish & Richardson P.C. Amendment in Reply to Action dated Sep. 2, 2011, in U.S. Appl. No. 12/727,186, mailed Jul. 2, 2012.

* cited by examiner

CUSTODIAN BASED CONTENT IDENTIFICATION

This application is related to U.S. patent application Ser. No. 11/694,307, filed on Mar. 30, 2007, entitled "Open Profile Content identification," and Ser. No. 11/694,345, filed on Mar. 30, 2007, entitled "Related Entity Content Identification" the disclosures of which are incorporated herein by reference.

BACKGROUND

This application relates to content identification.

Online social networks have become popular for professional and/or social networking. Some online social networks provide content items that may be of interest to users, e.g., digital advertisements targeted to a user, or identification of other users and/or groups that may of interest to a user. The content items can, for example, be selected based on content of a user account, e.g., based on keywords identified from a crawl of a user's page. Such content item identification schemes, however, may not identify optimum content items if the user page includes only short, ambiguous messages, misspelled words, or is primarily non-textual content, e.g., photograph collections, that present unique challenges for machine-based relevance analysis. Accordingly, some of the content items, e.g., advertisements directed to particular products, may not be of interest to many users of an online social network.

SUMMARY

Described herein are systems and methods for facilitating content identification based on custodian profiles. In one implementation, a first content item is identified, and a custodian profile associated with the first content item is identified. One or more second content items are identified based on the custodian profile.

In another implementation, a first content item is identified, and a custodian account associated with the first content item is identified. Signal data based on the custodian account is generated.

In another implementation, a system includes a custodian account processor and a content item server. The custodian account processor is configured to identify a custodian profile associated with a first content item. The content item server is configured to identifying one or more second content items based on the custodian profile.

DETAILED DESCRIPTION

Figure 1:
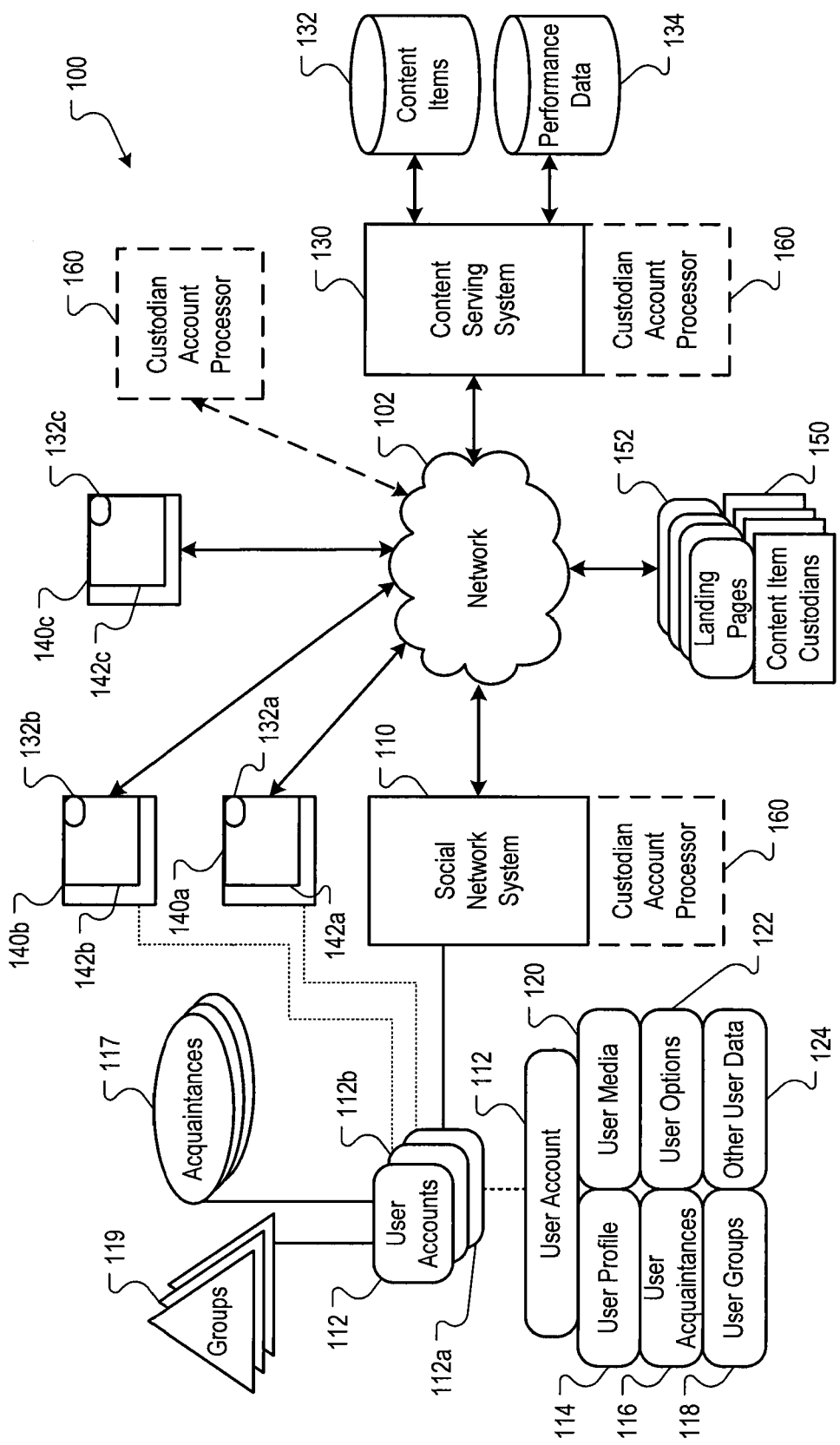
FIG. 1 is a block diagram of an example system for identifying content items based on custodian profiles.

FIG. 1 is a block diagram of an example system for identifying content items based on custodian profiles. A custodian profile, e.g., a user profile, associated with a first content item, e.g., a web page associated with the user profile in a social network system 110, can be identified as a first content item. The first content item can be utilized to identify one or more second content items, e.g., advertisements, that are displayed when the first content item is presented, e.g., viewed by another user of the social network 110.

In an implementation, the social network system 110 can, for example, host numerous user accounts 112. An example social network system can include Orkut, hosted by Google, Inc., of Mountain View, Calif. Other social networks can, for example, include school alumni websites, an internal company web site, dating networks, etc.

Each user account 112 can, for example, include user profile data 114, user acquaintance data 116, user group data 118, user media data 120, user options data 122, and other user data 124.

The user profile data 114 can, for example, include general demographic data about an associated user, such as age, sex, location, interests, etc. In some implementations, the user profile data 114 can also include professional information, e.g., occupation, educational background, etc., and other data, such as contact information. In some implementations, the user profile data 114 can include open profile data, e.g., free-form text that is typed into text fields for various subjects, e.g., "Job Description," "Favorite Foods," etc., and constrained profile data, e.g., binary profile data selected by check boxes, radio buttons, etc., or predefined selectable profile data, e.g., income ranges, zip codes, etc. In some implementations, some or all or the user profile data 114 can be classified as public or private profile data, e.g., data that can be shared publicly or data that can be selectively shared. Profile data 114 not classified as private data can, for example, be classified as public data, e.g., data that can be viewed by any user accessing the social network system 110.

The user acquaintances data 116 can, for example, define user acquaintances 117 associated with a user account 112. In an implementation, user acquaintances 117 can include, for example, users associated with other user accounts 112 that are classified as "friends," e.g., user accounts 112 referenced in a "friends" or "buddies" list. Other acquaintances 117 can also be defined, e.g., professional acquaintances, client acquaintances, family acquaintances, etc. In an implementation, the user acquaintance data 116 for each user account 112 can, for example, be specified by users associated with each user account 112, and thus can be unique for each user account 112.

The user group data 118 can, for example, define user groups 119 to which a user account 112 is associated. In an implementation, user groups 119 can, for example, define an interest or topic, e.g., "Wine," "Open Source Chess Programming," "Travel Hints and Tips," etc. In an implementation, the user groups 119 can, for example, be categorized, e.g., a first set of user groups 119 can belong to an "Activities" category, a second set of user groups 119 can belong to an "Alumni & Schools" category, etc.

The user media data 120 can, for example, include one or more content items, such as user documents, e.g., web pages. A document can, for example, comprise a file, a combination of files, one or more files with embedded links to other files, etc. The files can be of any type, such as text, audio, image, video, hyper-text mark-up language documents, etc. In the context of the Internet, a common document is a Web page. Other content items can also be defined by the user media data 120.

The user options data 122 can, for example, include data specifying user options, such as e-mail settings, acquaintance notification settings, chat settings, password and security settings, etc. Other option data can also be included in the user options data 122.

The other user data 124 can, for example, include other data associated with a user account 112, e.g., links to other social networks, links to other user accounts 112, online statistics, account payment information for subscription-based social networks, etc. Other data can also be included in the other user data 124.

Typically the user associated with the user account 112 has access privileges to add data to, delete data from, or otherwise edit the user media data 120, as well as other user account data. According, the user account 112 can be identified a custodian account 112b for the user media data 120. Likewise, the user profile data 114 can be identified as a custodian profile associated with the user media data 120.

In an implementation, a content serving system 130 can directly, or indirectly, enter, maintain, and track content items 132. The content items 132 can, for example, include a web page or other content document, or text, graphics, video, audio, mixed media, etc. In one implementation, the content items 132 are advertisements. The advertisements 132 can, for example, be in the form of graphical ads, such as banner ads, text only ads, image ads, audio ads, video ads, ads combining one of more of any of such components, etc. The advertisements 132 can also include embedded information, such as links, meta-information, and/or machine executable instructions.

In an implementation, user devices 140a, 140b and 140c can communicate with the social network system 110 over a network 102, such as the Internet. The user devices 140 can be any device capable of receiving the user media data 120, such as personal computers, mobile devices, cell phones, personal digital assistants (PDAs), television systems, etc. The user devices 140 can be associated with user accounts 112, e.g., the users of user devices 140a and 140b can be logged-in members of the social network system 110, having corresponding user accounts 112a and 112b. Additionally, the user devices 140 may not be associated with a user account 112, e.g., the user of the user device 142c may not be a member of the social network system 110 or may be a member of the social network system 110 that has not logged in.

In one implementation, upon a user device 140 communicating a request for media data 120 of a user account 112 to the social network system 110, the social network system 110 can, for example, provide the user media data 120 to user device 140. In one implementation, the user media data 120 can include an embedded request code, such as Javascript code snippets, in another implementation, the social network system 110 can insert the embedded request code with the user media data 120 when the user media data 120 is served to a user device 140.

The user device 140 can render the user media data 120 in a presentation environment 142, e.g., in a web browser application. Upon rendering the user media data 120, the user device 140 executes the request code, which causes the user device 140 to issue a content request, e.g., an advertisement request, to the content serving system 130. In response, the content serving system 130 can provide one or more content items 132 to the user device 140. For example, the content items 132a, 132b and 132c can be provided to the user devices 140a, 140b and 140c, respectively. In one implementation, the content items 132a, 132b and 132c are presented in the presentation environments 142a, 142b and 142c, respectively.

In an implementation, the content items 132a, 132b and 132c can be provided to the content serving system 130 by content item custodians 150, e.g., advertisers. The advertisers 150 can, for example, include web sites having "landing pages" 152 that a user is directed to when the user clicks an advertisement 132 presented on page provided from the social networking system 110. For example, the content item custodians 150 can provide content items 132 in the form of "creatives," which are advertisements that may include text, graphics and/or audio associated with the advertised service or product, and a link to a web site.

In one implementation, the content serving system 130 can monitor and/or evaluate performance data 134 related to the content items 132. For example, the performance of each advertisement 132 can be evaluated based on a performance metric, such as a click-through rate, a conversion rate, or some other performance metric. A click-through can occur, for example, when a user of a user device, e.g., user device 140a, selects or "clicks" on an advertisement, e.g. the advertisement 132a. The click-through rate can be a performance metric that is obtained by dividing the number of users that clicked on the advertisement or a link associated with the advertisement by the number of times the advertisement was delivered. For example, if advertisement is delivered 100 times, and three persons clicked on the advertisement, then the click-through rate for that advertisement is 3%.

A "conversion" occurs when a user, for example, consummates a transaction related to a previously served advertisement. What constitutes a conversion may vary from case to case and can be determined in a variety of ways. For example, a conversion may occur when a user of the user device 140a clicks on an advertisement 132a, is referred to the advertiser's Web page, such as one of the landing pages 152, and consummates a purchase before leaving that Web page. Other conversion types can also be used. A conversion rate can, for example, be defined as the ratio of the number of conversions to the number of impressions of the advertisement (i.e., the number of times an advertisement is rendered) or the ratio of the number of conversions to the number of selections. Other types of conversion rates can also be used.

Other performance metrics can also be used. The performance metrics can, for example, be revenue related or non-revenue related. In another implementation, the performance metrics can be parsed according to time, e.g., the performance of a particular content item 132 may be determined to be very high on weekends, moderate on weekday evenings, but very low on weekday mornings and afternoons, for example.

If is desirable that each of the content items 132 be related to the interests of the users utilizing the user devices 140a, 140b and 140c, as users are generally more likely to select, e.g., click through, content items 132 that are of particular interest to the users. One process to identify relevant content items 132 includes processing content, e.g., text data and/or metadata, included in a page currently rendered in a viewing instance 142 on a user device 140, e.g. a web page related to a user account 112 rendered in the presentation environment 142a on the user device 140a. The viewing of a web page associated with a user account 112 can be interpreted as a signal that the user viewing the web page is interested in subject matter related to the content of the web page. Such a process can generally provide relevant content items 132; however, if the content of the web page is incomplete, or of low quality or quantity, then the content items 132 that are identified and served may not be relevant to the viewers interests.

In an implementation, a signal of interest can be identified based on the custodian account 112b associated with a content item, e.g., a user account 112 associated with a user's web page defined by the user media data 120. For example, a viewer of a user web page in the social network system 110 may have interests in common with the custodian of the web page, e.g., the viewer may be a friend of the custodian, or may have academic or professional interests in common with the custodian, etc. As the data stored in the custodian account 112b likely provides information related to the custodian's interests, the data of the custodian account 112b can be utilized to identify content items 132 of potential interest to the viewer.

In one implementation, a custodian account processor 160 can, for example, identify a custodian account 112b associated with a first content item that is presented in a viewing instance, e.g., a custodian account 112b associated with a personal web page that is presented in a presentation environment 142 on a user device 140. Based on the data associated with the custodian account 112b, e.g., user profile data 114, or other custodian account 112b data, the custodian account processor 160 can generate targeting data that can be utilized by the content serving system 130 to identify one or more relevant second content items 132. Example targeting data includes keywords, and/or demographic signals, and/or category topics, or other targeting data that can be utilized by the content serving system 130 to identify content items 132.

In another implementation, another signal of interest can be identified based on the user account 112 associated with the viewer, which can be identified as a viewer account 112a. As the data stored in the viewer account 112a likely provides information related to the viewer's interests, the data of the viewer account 112a can be utilized to identify content items 132 of potential interest to the viewer.

In one implementation, the data of the viewer account 112a can be compared to the data of the custodian account 112b to identify common interests or topics. The custodian account processor 160 can, for example, determine if a user device 140 is associated with a user account 112, e.g., if a user of the user device 140 has logged-in under a particular user account 112. If the custodian account processor 160 determines that the user device 140 is associated with a user account 112, then the custodian account processor 160 can identify the user account 112 as a viewer account 112a. In one implementation, viewer account 112a data can be compared to custodian account data 112, e.g., the profile data 114 of the viewer account 112a can be compared to the profile data 114 of the custodian account 112b. Related data can be identified based on the comparison, and the custodian account processor 160 can generate targeting data based on the related data.

In one implementation, the custodian account processor 160 can be integrated into the social network system 110. In another implementation, the custodian account processor 160 can be integrated into the content server system 130. In another implementation, the custodian account processor 160 can be a separate system in data communication with the social network system 110 and/or the content server system 130.

Figure 9:
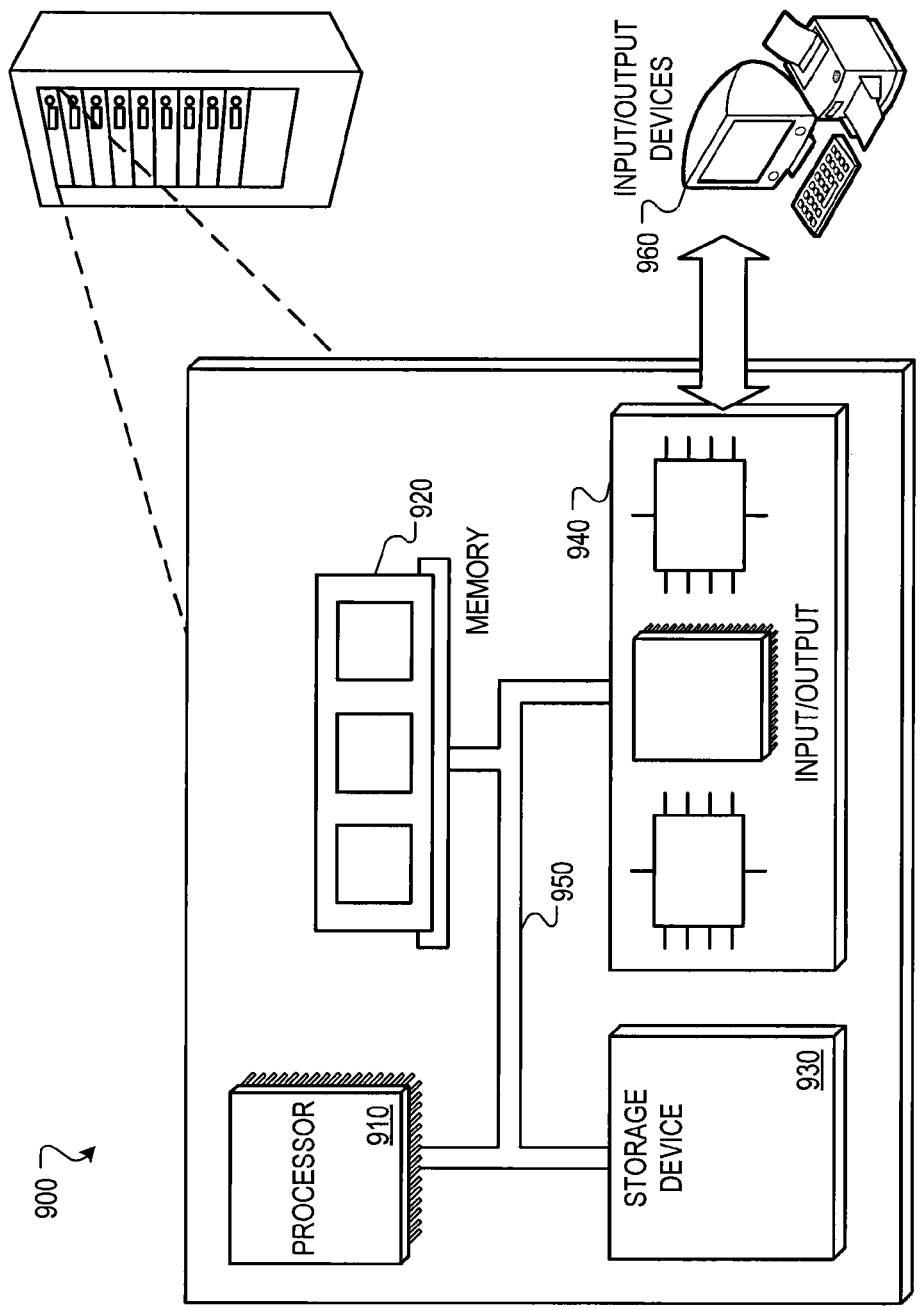
FIG. 9 is a block diagram of an example computer system that can be utilized to implement the systems and methods described herein.

The custodian account processor 160 can be implemented in software and executed on a processing device, such as the computer system 900 of FIG. 9. Example software implementations include C, C++, Java, or any other high-level programming language that may be utilized to produce source code that can be compiled into executable instructions. Other software implementations can also be used, such as applets, or interpreted implementations, such as scripts, etc.

Figure 2:
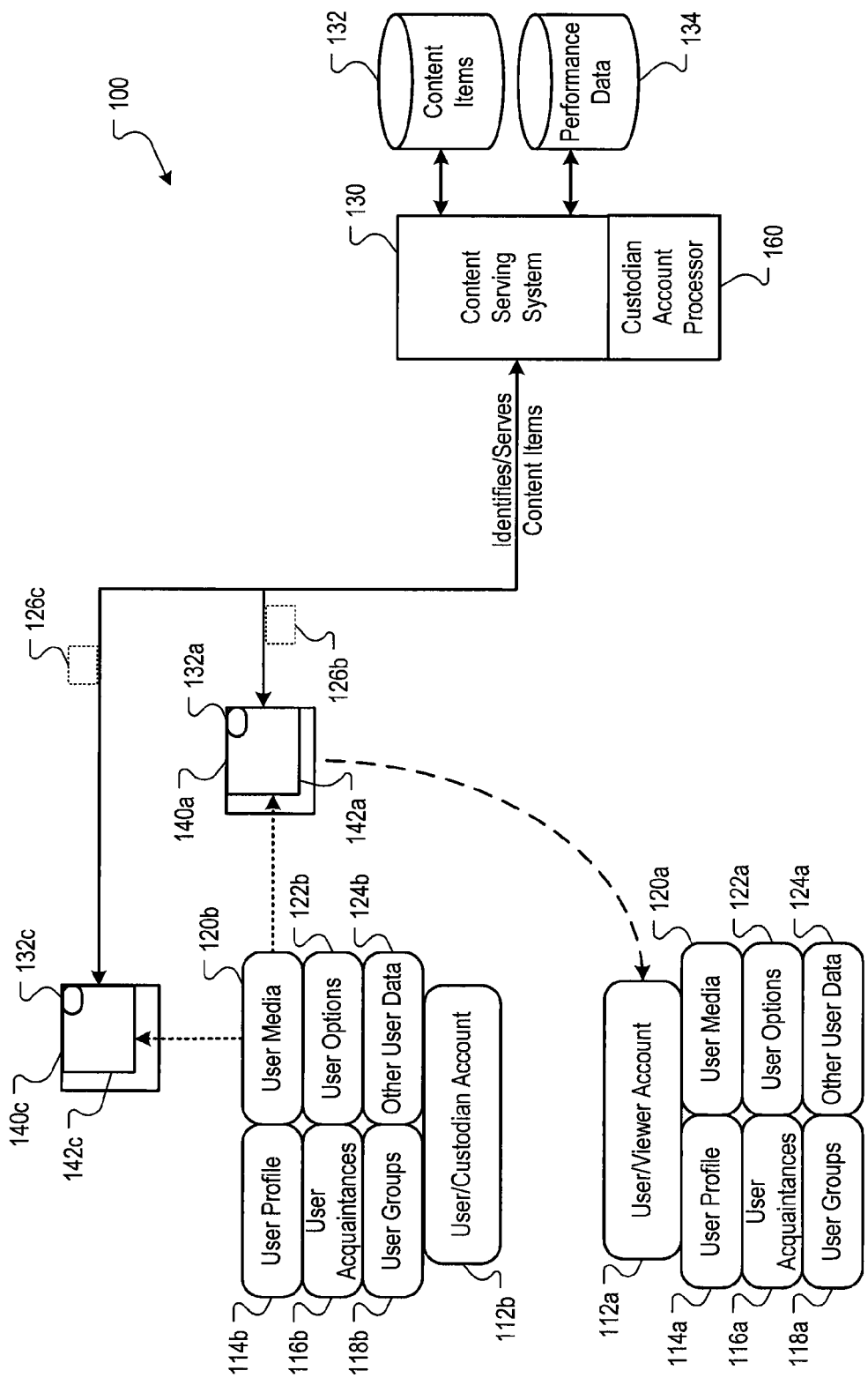
FIG. 2 is a more detailed block diagram of the example system for identifying content items based on custodian profiles.

FIG. 2 is a more detailed block diagram of the example system 100 for identifying content items based on custodian profiles, in the example system 100 of FIG. 2, the custodian account processor 160 is integrated info the content serving system 130. Other architectures as shown and described with respect to FIG. 1 can also be used.

As shown in FIG. 2, a first user associated with the user account 112a has utilized the user device 140a to log into a network, such as the social network system 110. The first user device 140a has instantiated a presentation environment 142a in which a content item, e.g., a web page, associated with a user account 112b has been rendered.

Likewise, a user device 140c utilized by a second user has instantiated a presentation environment 142c in which a content item, e.g., a web page, associated with the user account 112b has been rendered. The second user has not been associated with a user account 112, as the second user may not be a member of the social network system 110 or the second user may be a member of the social network system 110 but has not logged into the social network system 110.

In one implementation, the custodian account processor 160 can, for example, identify a first content item, e.g., the web page rendered in the presentation environment 142c, and identify the custodian account associated with the first content item, e.g., the custodian account 112b. The custodian account processor 160 can utilize data from the custodian profile data 114b to identify one or more second content items 132. The one or more second content items, e.g., content items 132c, can be served to the user device 140c.

For example, the custodian profile data 114b may include professional information such as "Fishing Guide," geographic information, such as "Key West, Fla.," and a list of interests related to fishing and boating. Accordingly, the custodian account processor 160 can generate targeting data, e.g., keywords, related to fishing and Key West. The keywords can be provided to the content serving system 130, which can, for example, serve advertisements 132c relating to Key West fishing guides. The advertisements 132c can be served for presentation in the presentation environment 142c on the user device 140c.

In another implementation, the custodian account processor 160 can, for example, identify a viewer account 112a associated with a user device 140a that has instantiated a viewing environment 142a in which the web page defined by the user media data 120b is rendered. In on implementation, the custodian processor 100 can, for example, compare viewer account data 112a, e.g., the viewer profile data 114a, to the custodian account 112b data, e.g., the custodian profile data 114b and generate targeting data for the identification of one or more second content items 132a.

For example, the viewer profile data 114a may include hobby information such as "deep sea fishing," geographic information, such as "Seattle, Wash.," and a list of interests related to deep sea fishing. Accordingly, the custodian account processor 160 can generate targeting data, e.g., keywords, related to deep sea fishing, travel from Seattle to Key West, and Key West. The keywords can be provided to the content serving system 130, which can, for example, serve advertisements 132a relating to Key West deep sea fishing guides and travel options between Seattle and Key West. The advertisements 132a can be served for presentation in the presentation environment 142a on the user device 140a.

Portions of the custodian account data 112b and the viewer account data 112a can be public data or private data, in one implementation, the custodian account processor 160 can be configured to compare only the public viewer account data 112a and the public custodian account data 112b. For example, if the geographic information in the viewer profile data 114a is designated as private, then the targeting data generated by the custodian account processor 160 may not include targeting data related to travel options between Seattle and Key West.

In another implementation, the custodian account processor 160 can, for example, identify unrelated viewer profile data 114a and custodian profile data 114b based on the comparison, and identify one or more second content items 132 based on the identified unrelated viewer profile data 114a and custodian profile data 114b. Such content items 132 can, for example, be precluded from being served for display in the viewing environment 132a.

In one implementation, the custodian account processor 160 can, for example, embed the custodian profile data 114b, or other custodian account 112b data, within a content item defined by the user media data 120b, e.g., a web page, a video file, etc. The custodian profile data 114b can, for example, be embedded as metadata, and the rendered web page can, for example, be crawled by the content serving system 130 to identify relevant content items 132. In one implementation, the embedded custodian profile data 114b can be encrypted.

In another implementation, the custodian account processor 160 can, for example, generate signal data from the custodian account 112b, e.g., demographic signal data, income signal date, etc. The signal data can, for example, be tokenized or encrypted and embedded within a content item defined by the user media data 120b, e.g., a web page, a video file, etc. The signal data can, for example, be interpreted by the content serving system 130 to identify relevant content items 132.

In another implementation, such embedded data can be transmitted from the user devices 140 in the form of a content item request 126. For example, upon rendering a web page in the presentation environment 142a, the user device 140a can execute a javascript to transmit a content item request 126a that includes encrypted custodian profile data 114b. Likewise, upon rendering a web page in the presentation environment 142c, the user device 140c can execute a javascript to transmit a content item request 126c that includes signal data related to the custodian account 112b.

Figure 3:
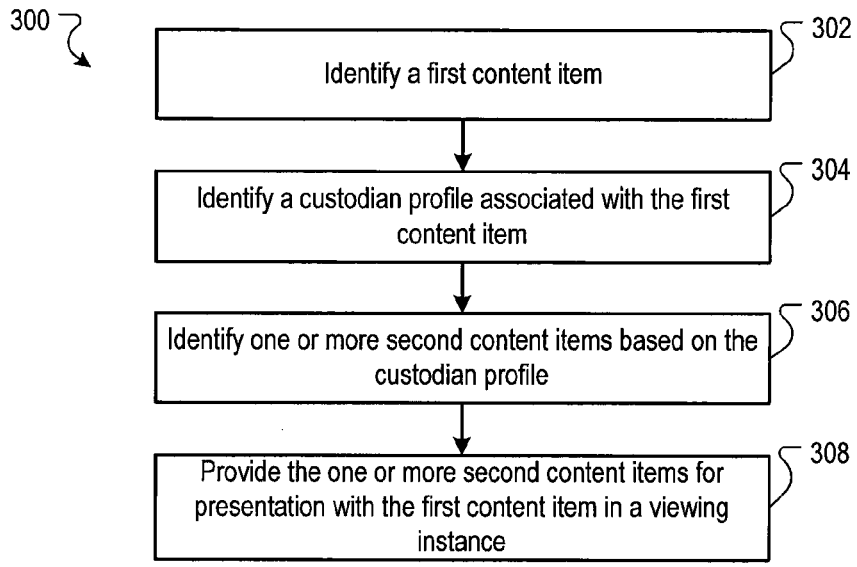
FIG. 3 is a flow diagram of an example process for identifying content items based on custodian profiles.

FIG. 3 is a flow diagram of an example process 300 for identifying content items based on custodian profiles. The process 300 can, for example, be implemented in the custodian account processor 160. In one implementation, the custodian account processor 160 can be integrated into the social network system 110. In another implementation, the custodian account processor 160 can be integrated into the content server system 130. In another implementation, the custodian account processor 160 can be a separate system in data communication with the social network system 110 and/or the content server system 130.

Stage 302 identifies a first content item. For example, the custodian account processor 160 can identify a first content item, e.g., a web page or a video file, presented in a presentation environment 142 on a user device 140.

Stage 304 identifies a custodian profile associated with the first content item. For example, the custodian account processor 160 can identify a custodian account 112b associated with the first content item, which includes a custodian profile.

Stage 306 identifies one or more second content items based on the custodian profile. For example, the custodian account processor 160 can provide targeting data based on the custodian profile 114b to a content serving system 130 to identify second content items 132, e.g., advertisements.

Stage 308 provides the one or more second content items for presentation with the first content item in a viewing instance. For example, the custodian account processor 160 and/or the content serving system 130 can serve the one or more second content items to the user device 140.

Other processes for identifying content items based on custodian profiles can also be used.

Figure 4:
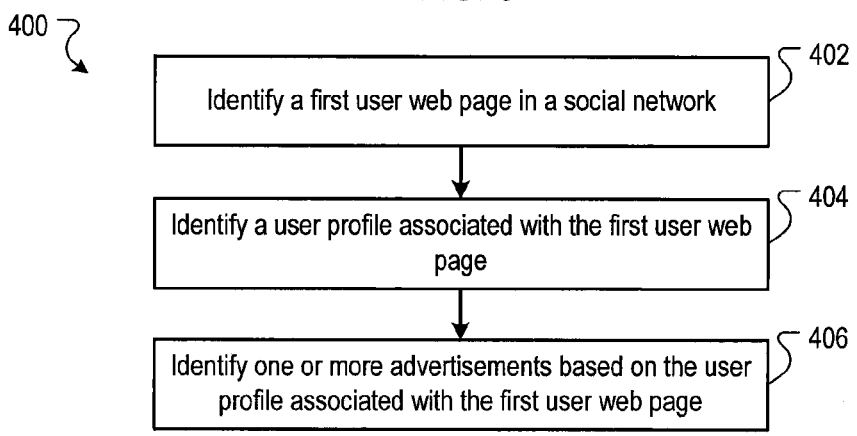
FIG. 4 is a flow diagram of an example process for identifying advertisements.

FIG. 4 is a flow diagram of an example process 400 for identifying advertisements. The process 400 can, for example, be implemented in the custodian account processor 160. In one implementation, the custodian account processor 160 can be integrated into the social network system 110. In another implementation, the custodian account processor 160 can be integrated info the content server system 130. In another implementation, the custodian account processor 160 can be a separate system in data communication with the social network system 110 and/or the content server system 130.

Stage 402 identifies a first user web page in a social network. For example, the custodian account processor 160 can identify a web page of a first user served by the social network system 110 that is presented in a presentation environment 142 on a user device 140.

Stage 404 identifies a user profile associated with the first user web page. For example, the custodian account processor 160 can identify a user account 112 associated with the first user. The first user account can include user profile data 114 associated with the first user web page.

Stage 406 identifies one or more advertisements based on the user profile associated with the first user web page. For example, the custodian account processor 160 and/or the content serving system 130 can process the first user profile data 114 to identify one or more advertisements 132.

Other processes for identifying advertisements can also be used.

Figure 5:
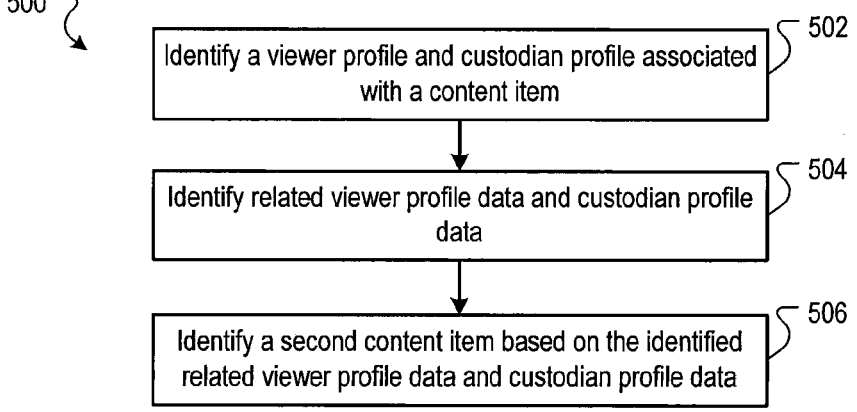
FIG. 5 is a flow diagram of an example process for identifying a second content item based on viewer profile data and custodian profile data.

FIG. 5 is a flow diagram of an example process 500 for identifying a second content item based on viewer profile data and custodian profile data. The process 500 can, for example, be implemented in the custodian account processor 160, in one implementation, the custodian account processor 160 can be integrated into the social network system 110. In another implementation, the custodian account processor 160 can be integrated into the content server system 130. In another implementation, the custodian account processor 160 can be a separate system in data communication with the social network system 110 and/or the content server system 130.

Stage 502 identifies a viewer profile and custodian profile associated with a content item. For example, the custodian account processor 160 can identify a viewer profile, e.g., viewer profile data 114a, and a custodian profile, e.g. custodian profile data 114b, associated with a viewing of a content item, e.g., a user web page of a user associated with the custodian profile data 114b that is being viewed on a user device 140a associated with the viewer account 112a.

Stage 504 identifies related viewer profile data and custodian profile data. For example, the custodian account processor 160 can compare the viewer profile data 114a and custodian profile data 114b to identify common topics, common interests, or other related data.

Stage 506 identifies a second content item based on the identified related viewer profile data and custodian profile data. For example, the custodian account processor 160 and/ or the content serving system 130 can identify content items 132 based on the identified common topics, common interests, or other related data.

Other processes for identifying a second content item based on viewer profile data and custodian profile data can also be used.

Figure 6:
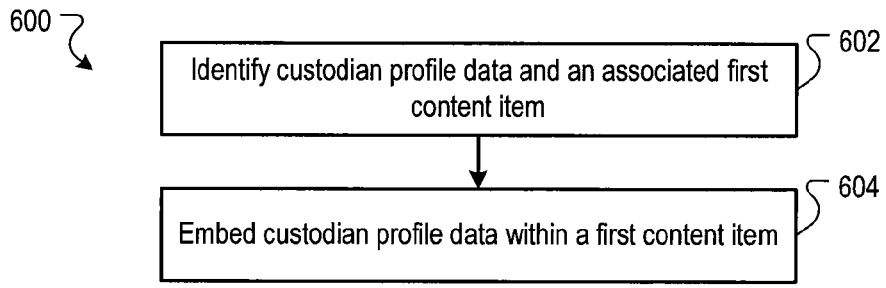
FIG. 6 is a flow diagram of an example process for embedding custodian profile data in a first content item.

FIG. 6 is a flow diagram of an example process 600 for embedding custodian profile data in a first content item. The process 600 can, for example, be implemented in the custodian account processor 160. In one implementation, the custodian account processor 160 can be integrated into the social network system 110. In another implementation, the custodian account processor 160 can be integrated into the content server system 130. In another implementation, the custodian account processor 160 can be a separate system in data communication with the social network system 110 and/or the content server system 130.

Stage 602 identifies custodian profile data and an associated first content item. For example, the custodian account processor 160 can identify custodian profile data 114*b* associated with a content item, e.g., a web page, stored in corresponding custodian media data 120*b*.

Stage 604 embeds custodian profile data 114*b* within a first content item. For example, the custodian account processor 160 can embed some or all of the custodian profile data 114*b* in the web page stored in the custodian media data 120*b*. In one implementation, the custodian profile data 114*b* can be encrypted and embedded as metadata in the first content item.

Other processes embedding custodian profile data in a first content item can also be used.

Figure 7:
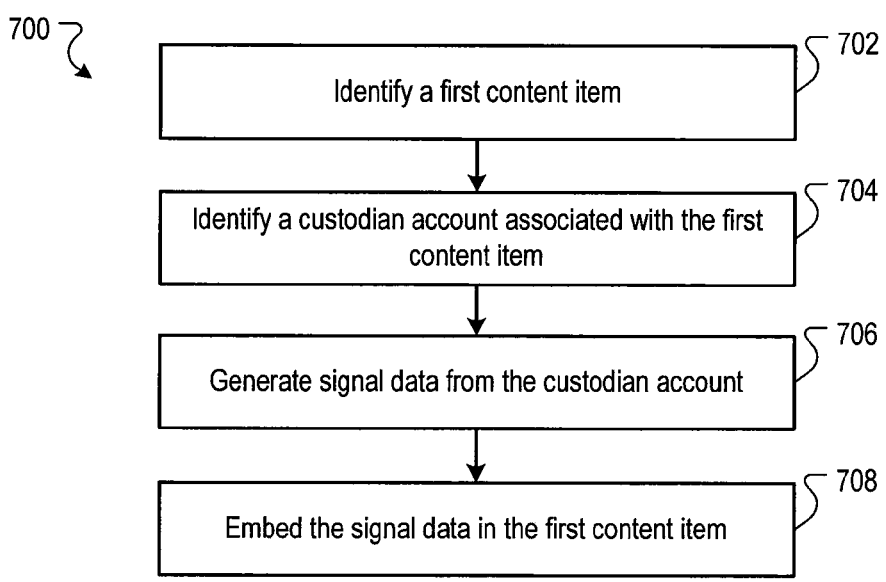
FIG. 7 is a flow diagram of an example process for embedding signal data in a first content item.

FIG. 7 is a flow diagram of an example process 700 for embedding signal data in a first content item. The process 700 can, for example, be implemented in the custodian account processor 160. In one implementation, the custodian account processor 160 can be integrated into the social network system 110. In another implementation, the custodian account processor 160 can be integrated into the content server system 130. In another implementation, the custodian account processor 160 can be a separate system in data communication with the social network system 110 and/or the content server system 130.

Stage 702 identifies a first content item. For example, the custodian account processor 160 can identify a first content item, e.g., a web page stored in custodian media data 120*b*.

Stage 704 identifies a custodian account associated with the first content item. For example, the custodian account processor 160 can identify the custodian account 112*b* associated with the first content item.

Stage 706 generates signal data from the custodian account. For example, the custodian account processor 160 can generate demographic signal data, income signal date, group signal data, acquaintance signal data, etc. from the custodian account 112*b*.

Stage 708 embeds the signal data in the first content item. For example, the custodian account processor 160 can embed the signal data into the web page stored in the custodian media data 120*b*. In one implementation, the signal data be tokenized or encrypted and embedded within a content item defined by the custodian media data 120*b*.

Other processes for embedding signal data in a first content item can also be used.

Figure 8:
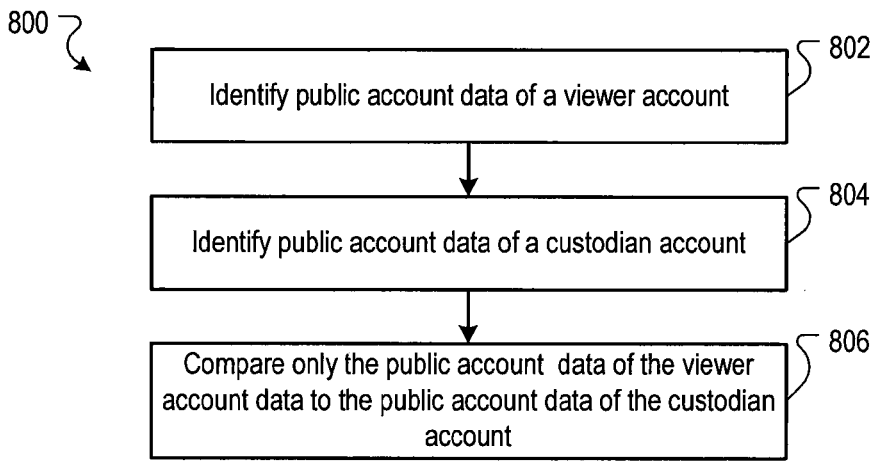
FIG. 8 is a flow diagram of an example process for processing public viewer profile data and public custodian profile data.

FIG. 8 is a flow diagram of an example process 800 for processing public viewer profile data and public custodian profile data. The process 800 can, for example, be implemented in the custodian account processor 160. In one implementation, the custodian account processor 160 can be integrated into the social network system 110. In another implementation, the custodian account processor 160 can be integrated into the content server system 130. In another implementation, the custodian account processor 160 can be a separate system in data communication with the social network system 110 and/or the content server system 130.

Stage 802 identifies public account data of a viewer account. For example, the custodian account processor 160 can identify data in a viewer account, e.g., viewer account 112*a*, that is categorized as public data.

Stage 804 identifies public account data of a custodian account. For example, the custodian account processor 160 can identify data in a custodian account, e.g., custodian account 112*b*, that is categorized as public data.

Stage 806 compares only the public account data of the viewer account to the public account data of the custodian account. For example, the custodian account processor 160 can compare the public custodian account data 112*b* to the public viewer account data 112*a* to generate targeting data for the identification of content items 132.

Other processes for processing public viewer profile data and public custodian profile data can also be used.

FIG. 9 is a block diagram of an example computer system 900 that can be utilized to implement the systems and methods described herein. The system 900 includes a processor 910, a memory 920, a storage device 930, and an input/output device 940. Each of the components 910, 920, 930, and 940 can, for example, be interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can, for example, include a hard disk device, an optical disk device, or some other large capacity storage device.

The input/output device 940 provides input/output operations for the system 900. In one implementation, the input/output device 940 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 960.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
identifying in a custodian account processor a first user account including a first content item and data defining a custodian profile associated with the first content item, wherein the custodian profile is a first user profile associated with the first user account in a social network, and the first content item is a web page of the first user account;
receiving a viewer request to access the web page through a viewing instance associated with a second user profile associated with a second user account in the social network, wherein the second user account comprises data defining the second user profile;
comparing the data defining the custodian profile from the first user account and the data defining the second user profile from the second user account to identify common topics and non-common topics, wherein a common topic is associated with both the custodian profile and the second user profile, and a non-common topic is a topic associated with only one of the custodian profile or the second user profile; that are common to the custodian profile and the second user profile;
generating in the custodian account processor advertisement targeting data from the common topics and the non-common topics identified from the custodian profile and the second user profile, the advertisement targeting data for targeting advertisements of a plurality of advertisers for presentation with the web page of the first user account through the viewing instance for the second user profile;
identifying in a content server:
a first set of advertisements stored in a content item data store based on the advertisement targeting data associated with the common topics; and
a second set of advertisements stored in the content item data store based on the advertisement targeting data associated with the non-common topics; and
providing one or more of the first set of advertisements for presentation with the web page of the first user account through the viewing instance for the second user profile and precluding advertisements in the second set of advertisements from being provided for presentation with the web page of the first user account through the viewing instance for the second user profile.

2. The method of claim 1, wherein:
the custodian profile and the second user profile each comprise public profile data and private profile data; and
comparing the second user profile to the custodian profile comprises comparing only the public profile data of the second user profile to the public profile data of the custodian profile.

3. The method of claim 1, comprising:
embedding the data defining the custodian profile as metadata within the web page of the first user account;
wherein:
identifying in a custodian account processor a first user account including a first content item and a custodian profile associated with the first content item comprises searching the first content item for metadata defining the custodian profile.

4. A computer storage medium encoded with a computer program, the program comprising instructions that when executed by a data processing apparatus cause the data processing apparatus to perform operations, comprising:
identifying in a custodian account processor a first user account including a first content item and custodian account data associated with the first content item, wherein the custodian account data comprises data defining a first user profile associated with the first user account in a social network, and the first content item is a web page of the first user account;
receiving a viewer request to access the web page through a viewing instance associated with viewer account data comprising data defining a second user profile associated with a second user account in the social network;
comparing the custodian account data from the first user account and the viewer account data from the second user account to identify common topics and non-common topics, wherein a common topic is associated with both the custodian account data and the viewer account data, and a non-common topic is a topic associated with only one of the custodian account data and the viewer account data;
generating in the custodian account processor signal data from common topics and the non-common topics identified from the custodian account data and viewer account data for targeting advertisements of a plurality of advertisers for presentation with the web page of the first user account through the viewing instance for the second user profile;
identifying in a content server:
a first set of advertisements stored in a content item data store based on the signal data associated with the common topics; and
a second set of advertisements stored in the content item data store based on the signal data associated with the non-common topics; and
providing one or more of the first set of advertisements for presentation with the web page of the first user account through the viewing instance for the second user profile and precluding advertisements in the second set of advertisements from being provided for presentation with the web page of the first user account through the viewing instance for the second user profile.

5. The computer storage medium of claim 4, wherein program further comprising instructions that when executed by the data processing apparatus cause the data processing apparatus to perform operations comprising:
embedding the signal data in the first content item.

6. The computer storage medium of claim 4, wherein:
generating in the custodian account processor signal data comprises generating demographic signals.

7. The computer storage medium of claim 4, wherein:
generating in the custodian account processor signal data comprises generating encrypted signal data.

8. A system, comprising:
a data processor;
a custodian account processor subsystem stored in a memory device in data communication with the data processor and upon execution by the data processor identifies a first user account including a first content item and data defining a custodian profile associated with the first content item, wherein the custodian profile is a first user profile associated with the first user account in a social network, and the first content item is a web page of the first user account, receives a viewer request to access the web page through a viewing instance from a viewer having a second user profile associated with a second user account in the social network, wherein the second user account comprises data defining the second user profile, compare the data defining the custodian profile and the second user profile to identify common topics and non-common topics, wherein a common topic is associated with both the custodian profile and the second user profile, and a non-common topic is a topic associated with only one of the custodian profile or the second user profile; and generates advertisement targeting data from the common topics and the non-common topics identified from the custodian profile and second user profile for targeting advertisements of a plurality of advertisers for presentation with the web page of the first user account through the viewing instance for the second user profile; and a content item server configured to identify:
  a first set of advertisements stored in a content item data store based on the advertisement targeting data associated with the common topics; and
  a second set of advertisements stored in the content item data store based on the advertisement targeting data associated with the non-common topics; and
  to provide one or more of the first set of advertisements for presentation with the web page of the first user account through the viewing instance for the second user profile, and preclude advertisements in the second set of advertisements from being provided for presentation with the web page of the first user account through the viewing instance for the second user profile.

9. The method of claim 1, wherein the data defining the custodian profile comprises at least one of demographic data, interest data, and professional information data.

10. The method of claim 1, further comprising:
  comparing the data defining the second user profile with the data defining the custodian profile to identify one or more keywords or topics of interest; and
  wherein generating the advertisement targeting data includes generating the advertisement targeting data based on the one or more identified keywords or topics of interest.

11. The computer storage medium of claim 4, further comprising:
  comparing the viewer account data with the custodian account data to identify one or more keywords or topics of interest; and
  wherein generating the advertisement targeting data includes generating the advertisement targeting data based on the one or more identified keywords or topics of interest.

12. The system of claim 8, wherein the custodian account processor subsystem, upon execution by the data processor, further compares the data defining the second user profile with the data defining the custodian profile to identify one or more keywords or topics of interest, and generates the advertisement targeting data based on the one or more identified keywords or topics of interest.

13. The method of claim 1, wherein upon selection of each of the one or more advertisements at a user device the user device is directed to a landing page of the corresponding advertiser.

14. The computer storage medium of claim 4, wherein upon selection of each of the one or more advertisements at a user device, the user device is directed to a landing page of the corresponding advertiser.

15. The system of claim 8, wherein upon selection of each of the one or more advertisements at a user device, the user device is directed to a landing page of the corresponding advertiser.

16. The method of claim 1, wherein:
  the custodian profile and the second user profile each comprise public profile data and private profile data, wherein the public profile data comprise data in the custodian profile and the second user profile that has been designated as being public and the private profile data comprise data in the custodian profile and the second user profile that has been designated as being private; and
  generating advertisement targeting data comprises excluding data from the advertisement targeting data related to the private profile data.

* * * * *

UNITED STATES PATENT AND TRADEMARK OFFICE
CERTIFICATE OF CORRECTION

PATENT NO. : 8,321,462 B2
APPLICATION NO. : 11/694618
DATED : November 27, 2012
INVENTOR(S) : Megan Nance It is certified that error appears in the above-identified patent and that said Letters Patent is hereby corrected as shown below:

In Claim 1, Line 31-32, Column 11, after "profile;" delete "that are common to the custodian profile and the second user profile", therefor.

In Claim 13, Line 21, Column 14, after "device" insert -- , --, therefor.

Signed and Sealed this
Fifth Day of March, 2013

Teresa Stanek Rea
*Acting Director of the United States Patent and Trademark Office*